(12) United States Patent
Dudley et al.

(10) Patent No.: US 11,323,178 B1
(45) Date of Patent: May 3, 2022

(54) TRANSPORT CONTROL BASED ON LAYER 1 CHANNEL CHARACTERISTICS

(71) Applicant: Charter Communications Operating, LLC, St. Louis, MO (US)

(72) Inventors: Thomas Dudley, Castle Rock, CO (US); Ognian Mitev, Aurora, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

(21) Appl. No.: 17/152,232

(22) Filed: Jan. 19, 2021

(51) Int. Cl.
*H04B 10/079* (2013.01)
*H04B 10/2507* (2013.01)

(52) U.S. Cl.
CPC ... *H04B 10/07953* (2013.01); *H04B 10/2507* (2013.01)

(58) Field of Classification Search
None
See application file for complete search history.

(56) References Cited

U.S. PATENT DOCUMENTS

| | | | | |
|---|---|---|---|---|
| 5,777,761 A * | 7/1998 | Fee | ...................... | H04J 14/0291 370/225 |
| 6,522,638 B1 * | 2/2003 | Haugli | .................. | H04B 7/1858 370/321 |
| 6,690,884 B1 * | 2/2004 | Kelty | .................... | H04B 10/695 398/27 |
| 6,839,515 B1 * | 1/2005 | Jahreis | .................. | H04B 10/032 340/2.9 |
| 6,879,559 B1 * | 4/2005 | Blackmon | ............... | H04L 45/00 370/216 |
| 2002/0122223 A1 * | 9/2002 | Gallant | .................. | H04B 10/00 398/9 |
| 2003/0215231 A1 * | 11/2003 | Weston-Dawkes | ......................... | H04J 14/0294 398/19 |
| 2004/0131353 A1 * | 7/2004 | Cannon | ................ | H04B 10/296 398/1 |
| 2006/0120718 A1 * | 6/2006 | Natori | .................. | H04J 14/0295 398/19 |

\* cited by examiner

*Primary Examiner* — Darren E Wolf
(74) *Attorney, Agent, or Firm* — Mendelsohn Dunleavy, P.C.; Steve Mendelsohn

(57) ABSTRACT

In certain embodiments, a communication (comm) network has a plurality of interconnected comm systems and a transport controller, each comm system having one or more Layer 1 (L1) components connected to one or more Layer 3 (L3) components, wherein at least one L1 component is connected to an L1 component of a different comm system by a link. The transport controller queries L1 components in the comm network for channel characteristics (e.g., optical signal-to-noise ratios (OSNRs)) for links in the comm network and modifies a metric value for a link in the comm network based on the channel characteristic for the link, such that an L3 component transitions from (i) transmitting signals via a first comm path that includes the link to (ii) transmitting signals via a different, second comm path that does not include the link. In this way, system outages due to degraded links can be avoided.

14 Claims, 5 Drawing Sheets

100

TRANSPORT CONTROL BASED ON LAYER 1 CHANNEL CHARACTERISTICS

BACKGROUND

Field of the Disclosure

The present disclosure relates to distributed communication networks and, more specifically but not exclusively, to optical communication networks that transmit signals over optical fibers and the like.

Description of the Related Art

This section introduces aspects that may help facilitate a better understanding of the disclosure. Accordingly, the statements of this section are to be read in this light and are not to be understood as admissions about what is prior art or what is not prior art.

FIG. 1 is a block diagram of a portion of a conventional optical communication network 100 comprising (at least) four different communication (comm) systems (Systems A-D) located, for example, in four different cities, where System B transmits signals to System A over an optical link LK(B,A) and to System C over an optical link LK(B,C), System A transmits signals to System D over an optical link LK(A,D), and System C transmits signals to System D over an optical link LK(C,D), where each optical link may be an optical fiber of a multi-fiber optical transport network.

Depending on the particular implementation, signals may be transmitted in the opposite directions over the same optical fibers or over different optical fibers of the corresponding optical transport networks. Thus, for example, there may be a separate optical fiber that support a link LK(A,B) that carries signals from System A to System B. Those skilled in the art will understand that, in general, the comm network 100 may have a number of comm systems located, for example, in different cities that exchange signals over optical links.

It is known to assign a standard metric value M(i,j) to each optical link LK(i,j) connecting Systems i and j that reflects the quality of communications over that link, where lower metric values correspond to higher communication quality. In some implementations, the standard metric values are based on communication characteristics such as latency, jitter, and packet loss rate.

In the example network 100 of FIG. 1, the four links have been assigned the following standard metric values reflecting the relative quality of communications over those links:
  A standard metric value M(B,A) of 30 for link LK(B,A);
  A standard metric value M(B,C) of 40 for link LK(B,C);
  A standard metric value M(C,D) of 50 for link LK(C,D); and
  A standard metric value M(A,D) of 40 for link LK(A,D).

In the network shown in FIG. 1, there are two different paths available for transmitting signals from System B to System D: either via System A (i.e., path (B,A,D)) or via System C (i.e., path (B,C,D)). According to conventional transport control techniques, a Layer 3 (L3) component (e.g., a router, not shown) in System B will select the path via System A instead of the path via System C, because the total metric value M(B,A,D) of the path (B,A,D) via System A (i.e., M(B,A,D)=M(B,A)+M(A,D)=30+40=70) is smaller than the total metric value M(B,C,D) of the path (B,C,D) via System C (i.e., M(B,C,D)=M(B,C)+M(C,D)=40+50=90), where the path having the smallest total metric value is assumed to be the path having the highest communication quality.

SUMMARY

One of the primary goals in any communication network, such as comm network 100 of FIG. 1, is to avoid system outages during which some signals may be lost and other signals may be delayed. If and when, for example, the optical signal-to-noise ratio (OSNR) of the link LK(B,A) in network 100 degrades (i.e., decreases) over time, there may occur a time at which the link LK(B,A) is unable to reliably transport signals between from System B to System A. In that case, an L3 component in System B will need to transmit signals from System B to System D via System C instead of via System A. During the time that it takes to reconfigure the network 100 for the new path, signals already in transit from System B to System D via System A may be lost and other signals that need to be transmitted from System B to System D may be delayed.

These problems in the prior art are addressed in accordance with the principles of the present disclosure by a centralized transport controller that automatically and periodically queries the Layer 1 (L1) components in the various comm systems in a communication network to determine the current OSNR values for the optical links connected to those L1 components, where those OSNR values are then used to determine whether to change the paths for signals transmitted within that network. In this way, before a currently provisioned (i.e., primary) path having a degrading optical link becomes unreliable, the comm network can make a graceful transition from transmitting signals over that the primary path to transmitting signals over an alternative (e.g., backup) path that does not involve the degrading optical link, thereby avoiding system outages.

BRIEF DESCRIPTION OF THE DRAWINGS

Embodiments of the disclosure will become more fully apparent from the following detailed description, the appended claims, and the accompanying drawings in which like reference numerals identify similar or identical elements.

DETAILED DESCRIPTION

Detailed illustrative embodiments of the present disclosure are disclosed herein. However, specific structural and functional details disclosed herein are merely representative for purposes of describing example embodiments of the present disclosure. The present disclosure may be embodied in many alternate forms and should not be construed as limited to only the embodiments set forth herein. Further, the terminology used herein is for the purpose of describing particular embodiments only and is not intended to be limiting of example embodiments of the disclosure.

As used herein, the singular forms "a," "an," and "the," are intended to include the plural forms as well, unless the context clearly indicates otherwise. It further will be understood that the terms "comprises," "comprising," "contains," "containing," "includes," and/or "including," specify the presence of stated features, steps, or components, but do not preclude the presence or addition of one or more other features, steps, or components. It also should be noted that in some alternative implementations, the functions/acts noted may occur out of the order noted in the figures. For example, two figures shown in succession may in fact be executed substantially concurrently or may sometimes be executed in the reverse order, depending upon the functions/acts involved.

Figure 1:
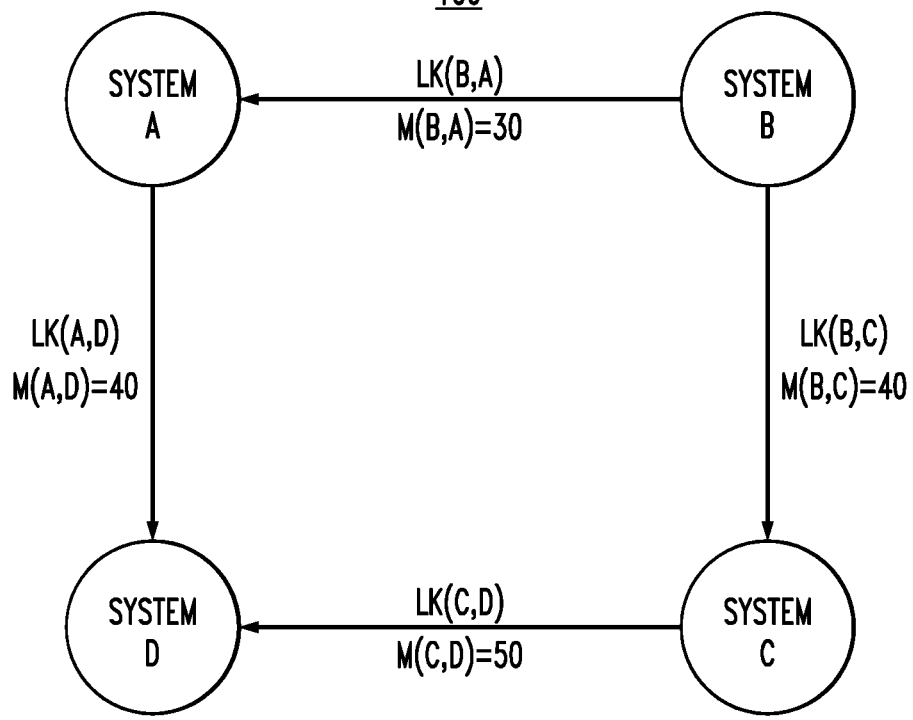
FIG. 1 is a block diagram of a portion of a conventional optical communication network.
Figure 2:
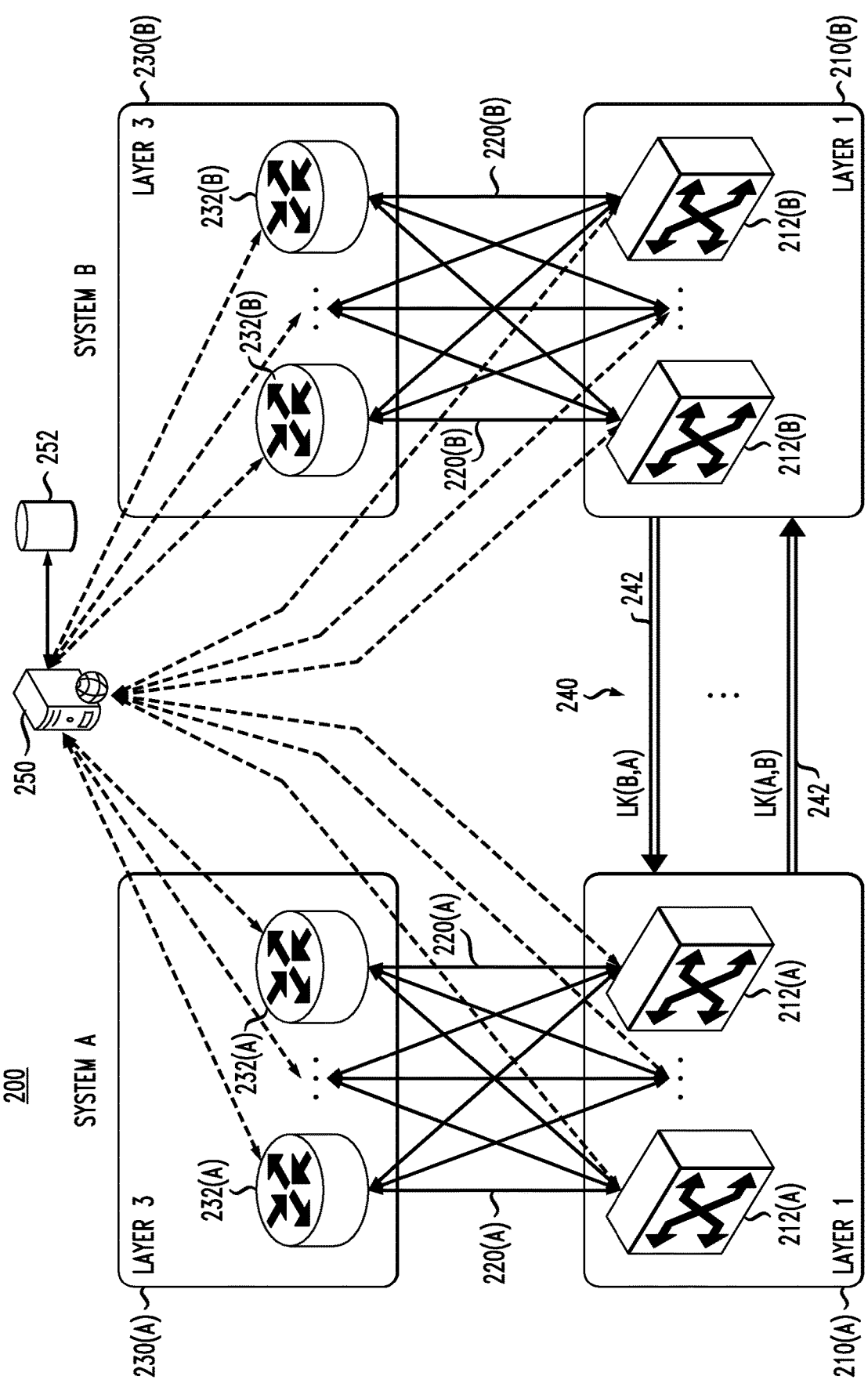
FIG. 2 is a block diagram of a portion of an optical communication network according to one embodiment of the disclosure.

FIG. 2 is a block diagram of a portion of an optical communication network 200 according to one embodiment of the disclosure. As shown in FIG. 2, network 200 comprises two different communication (comm) systems (System A and System B) located, for example, in two different cities, where Systems A and B exchange signals over an optical transport network 240 comprising one or more optical links 242. Systems A and B are analogous to Systems A and B of the conventional network 100 of FIG. 1, and network 200 also includes one or more additional comm systems analogous to Systems C and D of FIG. 1.

As shown in FIG. 2, System A has (i) a Layer 1 (L1) subsystem 210(A) comprising one or more L1 components 212(A) and (ii) a Layer 3 (L3) subsystem 230(A) comprising one or more L3 components 232(A), where each L1 component 212(A) is interconnected by one or more electrical connections 220(A) with one or more (but not necessarily all) L3 components 232(A), and vice versa. In addition, L1 components 212(A) in System A are connected to L1 components 212(B) in System B by optical links 242. Those skilled in the art will understand that, depending on the particular implementation:

The L1 components may include suitable components such as (without limitation) transponders, muxponders, amplifiers, wavelength-selective switch (WSS) reconfigurable optical drop-add multiplexers (ROADMs), and/or optical time-domain reflectometers (OTDRs);

The L3 components may include suitable components such as (without limitation) routers, switches, and/or other suitable end points for circuits interconnecting Systems A and B;

System A may include a Layer 2 (L2) subsystem and/or one or more additional, higher-layer (e.g., L4, L5, etc.) subsystems with additional suitable components; and System B is analogous to System A with (i) an analogous L1 subsystem 210(B) having one or more analogous L1 components 212(B) and (ii) an analogous L3 subsystem 230(B) having one or more analogous L3 components 232(B) interconnected by one or more analogous electrical connections 220(B).

As used herein, the term "circuit" refers to the end-to-end communication path from an L3 component in one system to and through the L1 component in that system to and through an optical link in the optical transport network to and through an L1 component in another system to an L3 component in that other system.

Each L3 component 232(A) in System A routes outgoing electrical signals via one or more electrical connections 220(A) to one or more System A L1 components 212(A), which convert or multiplex those optical electrical signals into outgoing optical signals that get transmitted via one or more optical links 242 in optical transport network 240 to one or more L1 components 212(B) in System B. In addition, each L1 component 212(A) in System A receives incoming optical signals via one or more optical links 242 in optical transport network 240 from one or more L1 components 212(B) in System B and converts or de-multiplex those optical signals into incoming electrical signals that get transmitted via one or more electrical connections 220(A) to one or more System A L3 components 232(A). System B operates in analogous ways to receive incoming optical signals from System A and transmit outgoing optical signals to System A.

Although not explicitly represented in FIG. 2:

An electrical connection 220(A) in System A interconnects a particular electrical port of a particular L1 component 212(A) to a particular electrical port of a particular L3 component 232(A);

That electrical port of that L3 component 232(A) is connected internally to a particular optical port of that L3 component 232(A);

An optical link 242 in transport network 240 interconnects that optical port of that L1 component 212(A) in System A to a particular optical port of a particular L1 component 212(B) in System B;

That optical port of that L1 component 212(B) is connected internally to a particular electrical port of that L1 component 212(B); and An electrical connection 220(B) in System B interconnects that electrical port of that L1 component 212(B) to a particular electrical port of a particular L3 component 232(B).

As shown in FIG. 2, comm network 200 also includes a centralized transport controller 250 and a local memory 252. The memory 252 stores the following databases:

A device inventory database that identifies (at least) the L1 and L3 components currently provisioned in the comm network 200;

A standards configuration database that stores the standard link metric values for the links in the comm network 200;

An OSNR threshold database that stores an OSNR threshold value for each link in the comm network 200; and An OSNR state database that stores the current OSNR state for each link in the comm network.

Depending on the particular implementation, the device inventory database may be generated and then updated manually or automatically as L1 and L3 components are added to and removed from the comm network 200. Devices are manually or automatically added to the device inventory database via Command Line Interface (CLI), Simple Network Management Protocol (SNMP), Netconf, Application Programming Interface (API), and/or other protocols, as the devices are being provisioned. Queries can be made by network management systems and element management systems to the existing network to discover equipment already deployed. The transport controller 250 can query an external circuit database for information on how the L1 and L3 components are connected.

In general, two L1 components in two different comm systems may have one or more optical links for signals transmitted between those two L1 components going in one direction and one or more other optical links for signals transmitted in the other direction. As described further below, the transport controller 250 (i) accesses the device inventory database in the memory 252 to identify and query each L1 component for current OSNR values and then (ii) uses those OSNR values to determine whether to modify the link metric values for associated links. In some implementations, the L1 component for a particular link LK(i,j) is the L1 component (in System j) that receives incoming optical signals from that link, while the L1 component for the corresponding link LK(j,i) in the opposite direction is the L1 component (in System i) that receives incoming optical signals from that corresponding link.

Figure 3:
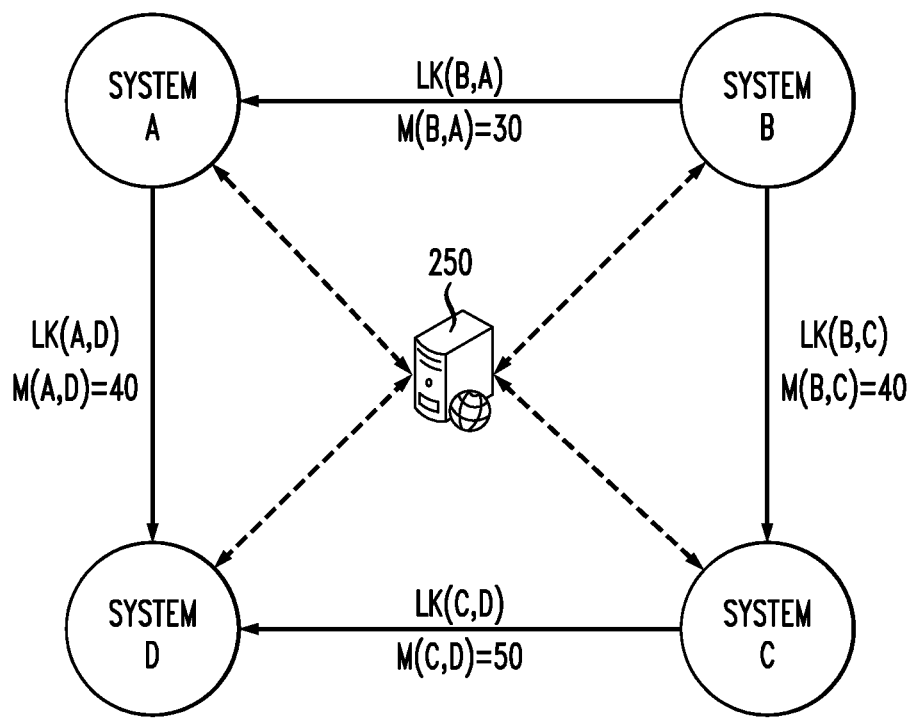
FIG. 3 is a block diagram of a portion of the comm network of FIG. 2 showing Systems A-D.

FIG. 3 is a block diagram of a portion of the comm network 200 of FIG. 2 showing Systems A-D, which are analogous to Systems A-D of FIG. 1. Also shown in FIG. 3 is the transport controller 250 of FIG. 2, which communicates with each comm system. As shown previously in FIG. 2, the transport controller 250 communicates with the L1 components in each comm system to query for current OSNR values. In addition, the transport controller 250 can communicate with the L3 components in each comm system to potentially modify the link metrics for the links associated with one or more of those L3 components. Depending on the particular implementation, the transport controller 250 can communicate with L1 and L3 components using suitable messaging, such as (without limitation) Simple Network Management Protocol (SNMP), Command Line Interface (CLI), Netconf, and/or Application Programming Interface (API) calls.

FIG. 3 represents, for example, the situation in comm network 200 that exists right after the network has been provisioned, where each link LK(i,j) has been assigned its standard metric value M(i,j) as stored in the standards configuration database in the memory 252 (not shown in FIG. 3), such that:

Link LK(B,A) is assigned its standard metric value M(B, A) of 30;
Link LK(B,C) is assigned its standard metric value M(B, C) of 40;
Link LK(C,D) is assigned its standard metric value M(C, D) of 50; and
Link LK(A,D) is assigned its standard metric value M(A, D) of 40.

As in FIG. 1, with all of the link metric values set to their corresponding standard metric values, an L3 component in System B will select the path (B,A,D) via System A to transmit signals to a corresponding L3 component in System D, because the total metric value of that path (i.e., 70) is less than the total metric value of the path (B,C,D) via System C (i.e., 90).

The transport controller 250 maintains the OSNR state database, which contains an OSNR state for each link LK(i,j) in the comm network 200, where the OSNR state represents whether the link's OSNR value was either (i) within specification (i.e., greater than or equal to a specified OSNR threshold value for the link as stored in the OSNR threshold database) or (ii) out of specification (i.e., less than the link's specified OSNR threshold value) when the L1 component associated with that link was previously queried by the transport controller 250.

Figure 4:
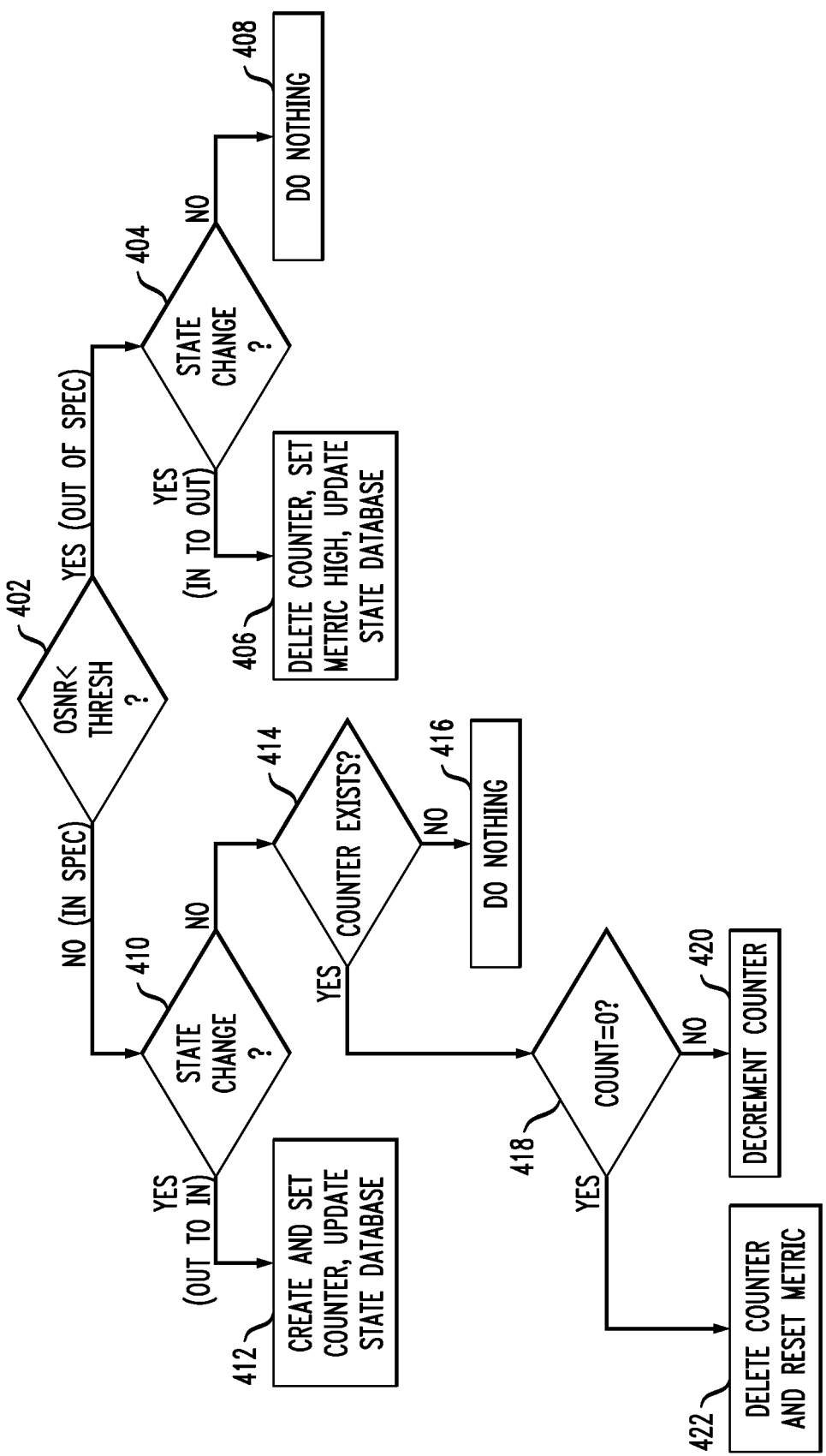
FIG. 4 represents the processing performed by the transport controller of FIGS. 2 and 3 for a given optical link in the comm network.

FIG. 4 represents the processing performed by the transport controller 250 of FIGS. 2 and 3 for a given optical link in the comm network 200. Prior to the processing of FIG. 4, the transport controller 250 would have queried each L1 component in each comm system in the network 200 for the OSNR value(s) for its associated link(s). Thus, for the links shown in FIG. 3, the transport controller 250 would query:

The appropriate L1 component in System A for the current OSNR value of its associated (incoming) link LK(B,A);
The appropriate L1 component in System C for the current OSNR value of its associated (incoming) link LK(B,C); and
The appropriate L1 component(s) in System D for the current OSNR values of the two associated (incoming) links LK(C,D) and LK(A,D).

The processing in FIG. 4 is then performed for each optical link. For example, for the link LK(B,A) of FIG. 3, in Step 402, the transport controller 250 compares (i) the current OSNR value for the link LK(B,A) received by the transport controller 250 from the associated L1 component in System A to (ii) the corresponding OSNR threshold value for the link LK(B,A) stored in the OSNR threshold database in memory 252. Note that, depending on the implementation, each link may have its own assigned OSNR threshold value. If the current OSNR value is below the OSNR threshold value, then the transport controller 250 determines that the link LK(B,A) is out of specification and processing continues to step 404. Otherwise, the transport controller 250 determines that the link LK(B,A) is within specification and processing continues to step 410.

In Step 404, the transport controller 250 determines whether or not an "in-to-out" state change has just occurred, i.e., whether or not the state of link LK(B,A) has just changed from (i) being within specification the last time the transport controller 250 queried the L1 component in System A for the OSNR value for link LK(B,A) to (ii) now being out of specification. If so, then processing proceeds to Step 406; otherwise, processing proceeds to Step 408.

Step 406 is reached when the transport controller 250 determines that the link LK(B,A) has just transitioned from being within specification to being out of specification. In that case, the transport controller 250 instructs the L3 component in System B to set its metric value M(B,A) for the link LK(B,A) to a suitably high value. In addition, in Step 406, the transport controller 250 deletes any counter that exists for the link LK(B,A) and updates the OSNR state database to reflect the new state (i.e., out of specification) for the link LK(B,A). More on this later.

Step 408 is reached when the transport controller 250 determines that the link LK(B,A) has remained out of specification for at least the two most recent query cycles. In that case, the transport controller 250 would have already previously set the metric value M(B,A) to a suitably high value when the link LK(B,A) first went out of specification. As such, in Step 408, the transport controller 250 does nothing.

Step 410 is reached when the transport controller 250 determines that the link LK(B,A) is currently within specification. In Step 410, the transport controller 250 determines whether or not an "out-to-in" state change has just occurred, i.e., whether or not the state of link LK(B,A) has just changed from (i) being out of specification the last time the transport controller 250 queried the L1 component in System A for the OSNR value for link LK(B,A) to (ii) now being out of specification. If so, then processing proceeds to Step 412; otherwise, processing proceeds to Step 414.

Thus, Step 412 is reached when the transport controller 250 determines that the link LK(B,A) has just transitioned from being out of specification to being within specification. In that case, the transport controller 250 creates a counter for the link LK(B,A), sets an initial value for the counter (e.g., 3 or some other suitable positive integer value), and updates the OSNR state database to reflect the new state (i.e., within specification) for the link LK(B,A).

Step 414 is reached when the transport controller 250 determines that the link LK(B,A) has remained within specification for at least the two most recent query cycles. In that case, the transport controller 250 determines whether a counter exists for the link LK(B,A). If so, then processing continues to Step EI; otherwise, processing continues to Step 416, where the transport controller 250 does nothing.

Step 418 is reached when the transport controller 250 determines that the link LK(B,A) has recently (but not just now) transitioned from being out of specification to being within specification. In that case, the transport controller 250 determines whether the counter has expired (i.e., the counter value has reached zero). If not, then processing continues to Step 420, where the transport controller 250 decrements the counter value for the link LK(B,A).

Otherwise, if the transport controller 250 determines in Step 418 that the counter has expired, then, in Step 422, the transport controller 250 deletes the counter and re-sets the link metric value for the link LK(B,A) to its standard metric value (stored in the standards configuration database).

Thus, if and when the transport controller 250 determines that the link LK(B,A) has just gone out of specification, the transport controller 250 will immediately set the link metric value M(B,A) for that link to a suitably high value. Furthermore, if and when the transport controller 250 determines that the link LK(B,A) has transitioned back within specification and stayed within specification for a specified number of cycles of processing, the transport controller 250 will re-set the link metric value M(B,A) to its standard (i.e., relatively low) metric value. The link is required to stay within regulation for a specified number of cycles before re-setting the link metric value in order to prevent network instability that can result from a link that toggles back and forth between being within specification and out of specification.

Figure 5:
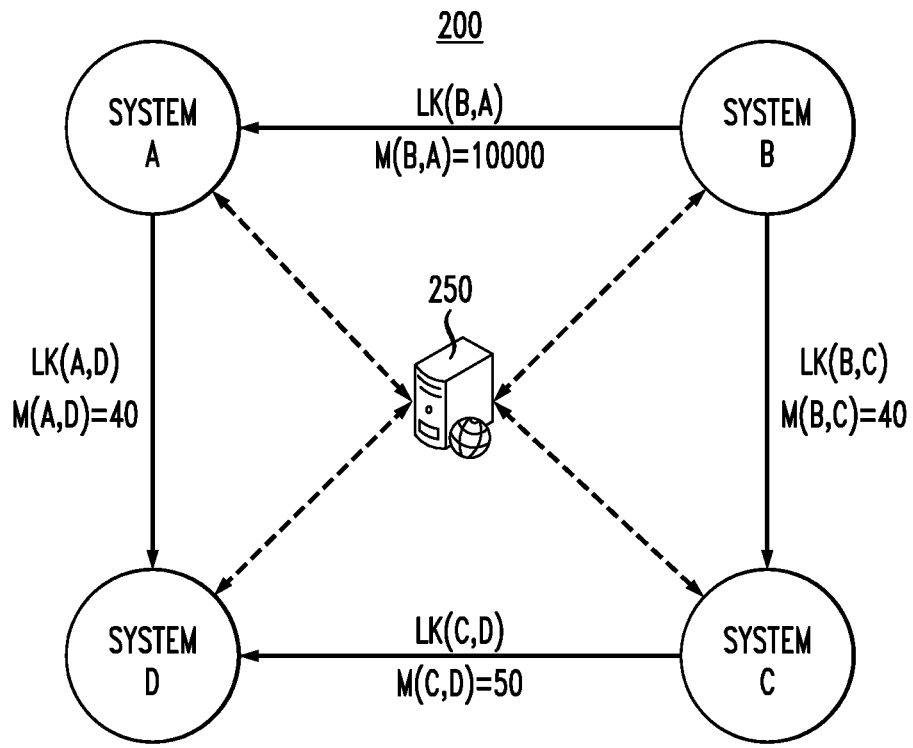
FIG. 5 is a block diagram of the portion of the comm network of FIG. 3 after the transport controller has determined that a link has just transitioned from being within specification to being out of specification.

FIG. 5 is a block diagram of the portion of the comm network 200 of FIG. 3 after the transport controller 250 has determined (in step 404 of FIG. 4) that the link LK(B,A) has just transitioned from being within specification to being out of specification. In that case, as shown in FIG. 5, the transport controller 250 has instructed the L3 component in System B (in step 406 of FIG. 4) to set the link metric value M(B,A) for the link LK(B,A) to a suitably high value, in this case, 10,000. With M(B,A)=10,000, the L3 component in System B that has been transmitting signals to System D via System A will determine that the total metric value M(B,A,D) for that path (B,A,D) is now 10,040, while the total metric value M(B,C,D) for the path (B,C,D) via System C is still at 90. As a result, the L3 component in System B will gracefully transition from transmitting signals to System D via System A to transmitting signals to System D via System C.

By setting the OSNR thresholds to appropriate values that represent situations where the performance of optical links are starting to degrade but have not yet degraded to the point where signals are lost, the comm network 200 can continue to operate without relatively slowly degrading optical links causing system outages. A link metric value used in step 406 of FIG. 4 will be suitably high if it guarantees that the L3 component will find a different path that avoids a degrading optical link.

Figure 6:
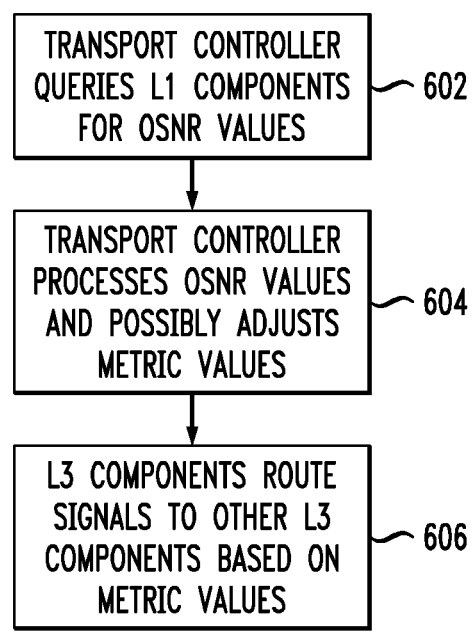
FIG. 6 is a flow diagram of the higher-level processing performed in the comm network of FIGS. 2, 3, and 5 associated with the present disclosure.

FIG. 6 is a flow diagram of the higher-level processing performed in the comm network 200 of FIGS. 2, 3, and 5 associated with the present disclosure. In Step 602, the transport controller 250 queries all of the L1 components in the comm network 200 for the current OSNR values associated with their optical links.

In Step 604, the transport controller 250 processes the received OSNR values according to the processing of FIG. 4 and, for each link, either leaves the metric value unchanged, sets the metric value to a suitably high value, or re-sets the metric value to the associated standard metric value.

In Step 606, each L3 component that has signals to transmit to another L3 component in another comm system uses the link metric values to calculate total metric values for different possible paths and selects the path having the lowest total metric value.

In some implementations, the L3 components determine alternative paths in real time. In other implementations, the L3 components determine backup paths ahead of time to be employed if and when they are needed.

Although the disclosure has been described in the context of transmission paths having two optical links, such as paths (B,A,D) and (B,C,D) of FIGS. 3 and 5, in general, a transmission path can have one or more optical links, and different transmission paths can have different numbers of optical links.

Although the disclosure has been described in the context of the comm network 200 of FIG. 2, which has (i) L1 components electrically connected to L3 components within each comm system and (ii) L1 components of one comm system optically connected to L1 components of one or more other comm systems, the disclosure is not so limited. In general, L1 components may be physically connected to L3 components in the same comm system by electrical, optical, and/or wireless connections;

L1 components may be physically connected to L1 components of different comm systems by electrical, optical, and/or wireless connections; and/or A comm network may have any suitable number of comm systems, pairs of which may be interconnected in analogous manner as Systems A and B of FIG. 2.

Although the disclosure has been described in the context of the transport controller that queries L1 components for the current OSNR values for their associated optical links and then uses those OSNR values to determine whether to modify link metric values, in other implementations, a transport controller may base modifications on link metric values on one or more characteristics other than or in addition to OSNR, such as (without limitation) (i) optical light levels, where lower optical light levels imply less preferred optical paths and (ii) nonlinear impairments due to adjacent optical wavelengths.

In certain embodiments, the present disclosure is a transport controller for a comm network comprising a plurality of interconnected comm systems, each comm system having one or more L1 components connected to one or more L3 components, wherein at least one L1 component is connected to an L1 component of a different comm system by a link, the transport controller comprising a hardware processor and a memory, wherein the processor is configured to query L1 components in the comm network for channel characteristics for links in the comm network and modify a metric value for a link in the comm network based on the channel characteristic for the link, such that an L3 component transitions from (i) transmitting signals via a first comm path that includes the link to (ii) transmitting signals via a different, second comm path that does not include the link.

In at least some of the above embodiments, the processor is configured to query the L1 components for optical signal-to-noise ratio (OSNR) values.

In at least some of the above embodiments, the processor is configured to (a) compare the channel characteristic for the link to a specified threshold value to determine whether the link is within specification or out of specification; and (b) modify the metric value for the link based on the comparison.

In at least some of the above embodiments, the processor is configured to modify the metric value for the link if the processor determines that the link has transitioned from being within specification to being out of specification.

In at least some of the above embodiments, the processor is configured to modify the metric value for the link if the processor determines that the link has just transitioned from being within specification to being out of specification.

In at least some of the above embodiments, the processor is configured to reset the metric value for the link to a standard metric value if the processor determines that the link has transitioned from being out of specification to being within specification and then remains within specification for a specified duration or a specified number of measurements of the channel characteristic.

Also for purposes of this disclosure, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

Signals and corresponding terminals, nodes, ports, links, interfaces, or paths may be referred to by the same name and are interchangeable for purposes here.

As used herein in reference to an element and a standard, the terms "compatible" and "conform" mean that the element communicates with other elements in a manner wholly or partially specified by the standard, and would be recognized by other elements as sufficiently capable of communicating with the other elements in the manner specified by the standard. A compatible or conforming element does not need to operate internally in a manner specified by the standard.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present disclosure may take the form of an entirely software embodiment (including firmware, resident software, microcode, and the like), an entirely hardware embodiment, or an embodiment combining software and hardware aspects that may generally be referred to herein as a "system."

Embodiments of the disclosure can be manifest in the form of methods and apparatuses for practicing those methods. Embodiments of the disclosure can also be manifest in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the disclosure. Embodiments of the disclosure can also be manifest in the form of program code, for example, stored in a non-transitory machine-readable storage medium including being loaded into and/or executed by a machine, wherein, when the program code is loaded into and executed by a machine, such as a computer, the machine becomes an apparatus for practicing the disclosure. When implemented on a general-purpose processor, the program code segments combine with the processor to provide a unique device that operates analogously to specific logic circuits.

Any suitable processor-usable/readable or computer-usable/readable storage medium may be utilized. The storage medium may be (without limitation) an electronic, magnetic, optical, electromagnetic, infrared, or semiconductor system, apparatus, or device. A more-specific, non-exhaustive list of possible storage media include a magnetic tape, a portable computer diskette, a hard disk, a random access memory (RAM), a read-only memory (ROM), an erasable programmable read-only memory (EPROM) or Flash memory, a portable compact disc read-only memory (CD-ROM), an optical storage device, and a magnetic storage device. Note that the storage medium could even be paper or another suitable medium upon which the program is printed, since the program can be electronically captured via, for instance, optical scanning of the printing, then compiled, interpreted, or otherwise processed in a suitable manner including but not limited to optical character recognition, if necessary, and then stored in a processor or computer memory. In the context of this disclosure, a suitable storage medium may be any medium that can contain or store a program for use by or in connection with an instruction execution system, apparatus, or device.

The functions of the various elements shown in the figures, including any functional blocks labeled as "processors," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those of ordinary skill in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain embodiments of this disclosure may be made by those skilled in the art without departing from embodiments of the disclosure encompassed by the following claims.

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the disclosure.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

All documents mentioned herein are hereby incorporated by reference in their entirety or alternatively to provide the disclosure for which they were specifically relied upon.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

As used herein and in the claims, the term "provide" with respect to an apparatus or with respect to a system, device, or component encompasses designing or fabricating the apparatus, system, device, or component; causing the apparatus, system, device, or component to be designed or fabricated; and/or obtaining the apparatus, system, device, or component by purchase, lease, rental, or other contractual arrangement.

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

What is claimed is:

1. A transport controller for a communication (comm) network comprising Layer 1 (L1) components connected to Layer 3 (L3) components, wherein (i) the L1 components are interconnected to other L1 components by links, (ii) the transport controller is configured to assign metric values to the links and inform the L3 components of the assigned metric values, and (iii) the L3 components are configured to implement a metric-based routing algorithm to select links of comm paths for communications in the comm network, the transport controller comprising a hardware processor and a memory, wherein the processor is configured to:
   query the L1 components for channel characteristics for the links, wherein the L3 components are unaware of the querying of the L1 components by the transport controller; and
   modify, at an L3 component, a metric value for a particular link in the comm network based on the channel characteristic for the particular link to cause the L3 component to implement the metric-based routing algorithm based on the modified metric value to determine to transition from (i) transmitting signals via a first comm path that includes the particular link to (ii) transmitting signals via a different, second comm path that does not include the particular link, wherein the transport controller (i) does not directly reconfigure any of the L1 components and (ii) does not explicitly identify the second comm path to the L3 component.

2. The transport controller of claim 1, wherein the processor is configured to query the L1 components for optical signal-to-noise ratio (OSNR) values.

3. The transport controller of claim 1, wherein the processor is configured to:
   (a) compare the channel characteristic for the link to a specified threshold value to determine whether the link is within specification or out of specification; and
   (b) modify the metric value for the link based on the comparison.

4. The transport controller of claim 3, wherein the processor is configured to modify the metric value for the link if the processor determines that the link has transitioned from being within specification to being out of specification.

5. The transport controller of claim 4, wherein the processor is configured to modify the metric value for the link if the processor determines that the link has transitioned from previously being within specification to newly being out of specification.

6. The transport controller of claim 4, wherein the processor is configured to reset the metric value for the link to a standard metric value if (i) the processor determines that the link has transitioned from being out of specification to being within specification and (ii) the processor then determines that the link remains within specification for a specified duration or a specified number of measurements of the channel characteristic.

7. The transport controller of claim 1, wherein the processor is configured to:

query the L1 components for OSNR values;

compare the OSNR value for the link to a specified threshold value to determine whether the link is within specification or out of specification;

modify the metric value for the link if the processor determines that the link has just transitioned from being within specification to being out of specification; and reset the metric value for the link to a standard metric value if (i) the processor determines that the link has transitioned from being out of specification to being within specification and (ii) the processor then determines that the link remains within specification for a specified duration or a specified number of measurements of the channel characteristic.

8. A hardware processor-implemented method for a communication (comm) network comprising Layer 1 (L1) components connected to Layer 3 (L3) components, wherein (i) the L1 components are interconnected to other L1 components by links, (ii) a hardware processor is configured to assign metric values to the links and inform the L3 components of the assigned metric values, and (iii) the L3 components are configured to implement a metric-based routing algorithm to select links of comm paths for communications in the comm network, the method comprising the hardware processor:

querying the L1 components for channel characteristics for the links, wherein the L3 components are unaware of the querying of the L1 components by the processor; and modifying, at an L3 component, a metric value for a particular link in the comm network based on the channel characteristic for the particular link to cause the L3 component to implement the metric-based routing algorithm based on the modified metric value to determine to transition from (i) transmitting signals via a first comm path that includes the particular link to (ii) transmitting signals via a different, second comm path that does not include the particular link, wherein the processor (i) does not directly reconfigure any of the L1 components and (ii) does not explicitly identify the second comm path to the L3 component.

9. The method of claim 8, wherein the processor queries the L1 components for OSNR values.

10. The method of claim 8, wherein the processor:
(a) compares the channel characteristic for the link to a specified threshold value to determine whether the link is within specification or out of specification; and
(b) modifies the metric value for the link based on the comparison.

11. The method of claim 10, wherein the processor modifies the metric value for the link if the processor determines that the link has transitioned from being within specification to being out of specification.

12. The method of claim 11, wherein the processor modifies the metric value for the link if the processor determines that the link has transitioned from previously being within specification to newly being out of specification.

13. The method of claim 11, wherein the processor resets the metric value for the link to a standard metric value if (i) the processor determines that the link has transitioned from being out of specification to being within specification and (ii) the processor then determines that the link remains within specification for a specified duration or a specified number of measurements of the channel characteristic.

14. The method of claim 8, wherein the processor:
queries the L1 components for OSNR values;
compares the OSNR value for the link to a specified threshold value to determine whether the link is within specification or out of specification;
modifies the metric value for the link if the processor determines that the link has just transitioned from being within specification to being out of specification; and
resets the metric value for the link to a standard metric value if (i) the processor determines that the link has transitioned from being out of specification to being within specification and (ii) the processor then determines that the link remains within specification for a specified duration or a specified number of measurements of the channel characteristic.

* * * * *